United States Patent
Wang et al.

(10) Patent No.: US 7,425,232 B2
(45) Date of Patent: Sep. 16, 2008

(54) HYDROGEN STORAGE APPARATUS COMPRISED OF HALLOYSITE

(75) Inventors: Xingwu Wang, Wellsville, NY (US); Michael L. Weiner, Webster, NY (US)

(73) Assignee: NaturalNano Research, Inc., Pittsford, NY (US)

( * ) Notice: Subject to any disclaimer, the term of this patent is extended or adjusted under 35 U.S.C. 154(b) by 751 days.

(21) Appl. No.: 11/099,055

(22) Filed: Apr. 5, 2005

(65) Prior Publication Data

US 2005/0233199 A1  Oct. 20, 2005

Related U.S. Application Data

(63) Continuation-in-part of application No. 11/042,219, filed on Jan. 25, 2005.

(60) Provisional application No. 60/559,555, filed on Apr. 5, 2004.

(51) Int. Cl.
*F17C 11/00* (2006.01)

(52) U.S. Cl. .................. 96/154; 502/526; 502/80; 206/0.7

(58) Field of Classification Search .......... 86/108, 86/154; 502/60, 87, 400, 415, 526; 206/0.7; 423/248, 648.1, 328.1; 977/813–815, 962
See application file for complete search history.

(56) References Cited

U.S. PATENT DOCUMENTS

| | | | |
|---|---|---|---|
| 3,581,159 A | 5/1971 | Piper |
| 3,648,126 A | 3/1972 | Boos |
| 3,915,731 A | 10/1975 | Sugahara |
| 4,019,934 A | 4/1977 | Takayama |
| 4,098,676 A | 7/1978 | Robson |
| 4,150,099 A | 4/1979 | Robson |
| 4,364,857 A | 12/1982 | Santilli |
| 4,383,606 A | 5/1983 | Hunter |
| 4,485,387 A | 11/1984 | Drumheller |
| 4,547,286 A | 10/1985 | Hsiung |
| 4,739,007 A | 4/1988 | Okada |
| 4,741,841 A | 5/1988 | Borre |
| 4,790,942 A | 12/1988 | Shmidt |
| 4,810,734 A | 3/1989 | Kawasumi |
| 4,838,606 A | 6/1989 | Furubayashi |
| 4,867,917 A | 9/1989 | Schnur |
| 4,877,501 A | 10/1989 | Schnur |
| 4,894,411 A | 1/1990 | Okada |
| 4,911,981 A | 3/1990 | Schnur |
| 4,944,883 A | 7/1990 | Schoendorfer |
| 4,960,450 A | 10/1990 | Schwarz |
| 4,990,291 A | 2/1991 | Schoen |
| 5,049,382 A | 9/1991 | Price |

(Continued)

OTHER PUBLICATIONS

Lvov, Yuri M., Nanofabrication of Ordered Multilayers by Alternate Adsorption of Polyions, Nanoparticles and Proteins: From Planar Films to Microtemplates, from latech.edu, Mar. 27, 2005, http://www2.latech.edu/~ylvov/research.html.

(Continued)

*Primary Examiner*—Frank M Lawrence

(57) ABSTRACT

Disclosed in this specification is an apparatus for storing hydrogen which is comprised of molecular hydrogen, halloysite rods, and a supporting substrate wherein hydrogen is stored within the lumen of the halloysite rods.

20 Claims, 9 Drawing Sheets

U.S. PATENT DOCUMENTS

| | | | |
|---|---|---|---|
| 5,053,127 | A | 10/1991 | Schoendorfer |
| 5,096,551 | A | 3/1992 | Schoen, Jr. |
| 5,102,948 | A | 4/1992 | Deguchi |
| 5,164,440 | A | 11/1992 | Deguchi |
| 5,171,206 | A | 12/1992 | Marque |
| 5,246,689 | A | 9/1993 | Beck |
| 5,248,720 | A | 9/1993 | Deguchi |
| 5,492,696 | A | 2/1996 | Price |
| 5,641,622 | A | 6/1997 | Lake |
| 5,651,976 | A | 7/1997 | Price |
| 5,653,951 | A | 8/1997 | Rodriguez |
| 5,654,117 | A | 8/1997 | Nealey |
| 5,674,173 | A | 10/1997 | Hlavinka |
| 5,681,464 | A | 10/1997 | Larsson |
| 5,705,191 | A | 1/1998 | Price |
| 5,722,923 | A | 3/1998 | Lui |
| 5,783,085 | A | 7/1998 | Fischel |
| 5,827,186 | A | 10/1998 | Chen |
| 5,854,326 | A | 12/1998 | Sakaya |
| 5,906,570 | A | 5/1999 | Langley |
| 5,906,792 | A | 5/1999 | Schulz et al. |
| 5,913,768 | A | 6/1999 | Langley |
| 5,939,319 | A | 8/1999 | Hlavinka |
| 5,951,877 | A | 9/1999 | Langley |
| 5,972,448 | A | 10/1999 | Frisk |
| 5,993,996 | A | 11/1999 | Firsich |
| 6,013,206 | A | 1/2000 | Price |
| 6,034,163 | A | 3/2000 | Barbee |
| 6,051,146 | A | 4/2000 | Green |
| 6,060,549 | A | 5/2000 | Li |
| 6,067,480 | A | 5/2000 | Stuffle |
| 6,071,422 | A | 6/2000 | Hlavinka |
| 6,074,453 | A | 6/2000 | Anderson |
| 6,117,541 | A | 9/2000 | Frisk |
| 6,143,052 | A | 11/2000 | Kiyokawa |
| 6,159,538 | A | 12/2000 | Rodriguez |
| 6,190,775 | B1 | 2/2001 | Smith et al. |
| 6,195,443 | B1 | 2/2001 | Hammond |
| 6,207,793 | B1 | 3/2001 | Kim |
| 6,231,980 | B1 | 5/2001 | Cohen |
| 6,265,038 | B1 | 7/2001 | Frisk |
| 6,280,759 | B1 | 8/2001 | Price |
| 6,290,753 | B1 | 9/2001 | Maeland |
| 6,294,142 | B1 | 9/2001 | Nazri |
| 6,331,253 | B1 | 12/2001 | Schrive |
| 6,354,986 | B1 | 3/2002 | Hlavinka |
| 6,356,433 | B1 | 3/2002 | Shi et al. |
| 6,401,816 | B1 | 6/2002 | Price |
| 6,461,513 | B1 | 10/2002 | Jen |
| 6,475,071 | B1 | 11/2002 | Joslyn |
| 6,491,789 | B2 | 12/2002 | Niu |
| 6,517,800 | B1 | 2/2003 | Cheng |
| 6,578,596 | B1 | 6/2003 | Batchelder |
| 6,589,312 | B1 | 7/2003 | Snow |
| 6,591,617 | B2 | 7/2003 | Wolfe |
| 6,596,055 | B2 | 7/2003 | Cooper |
| 6,665,169 | B2 | 12/2003 | Tennent et al. |
| 6,667,354 | B1 | 12/2003 | Fox |
| 6,672,077 | B1 | 1/2004 | Bradley |
| 6,704,192 | B2 | 3/2004 | Pekala |
| 6,710,111 | B2 | 3/2004 | Kuo |
| 6,728,456 | B1 | 4/2004 | Aylward |
| 6,749,414 | B1 | 6/2004 | Hanson |
| 6,767,952 | B2 | 7/2004 | Dontula |
| 6,770,697 | B2 | 8/2004 | Drewniak |
| 6,790,403 | B1 | 9/2004 | Priedeman, Jr. |
| 6,797,342 | B1 | 9/2004 | Sanchez |
| 6,811,599 | B2 | 11/2004 | Fischer |
| 6,832,037 | B2 | 12/2004 | Aylward |
| 7,248,460 | B2 | 7/2007 | Omura et al. |
| 2002/0110686 | A1 | 8/2002 | Dugan |
| 2002/0132875 | A1 | 9/2002 | Stadtmueller |
| 2002/0150529 | A1 | 10/2002 | Dillon et al. |
| 2002/0161101 | A1 | 10/2002 | Carroll et al. |
| 2002/0187896 | A1 | 12/2002 | Ryoo et al. |
| 2003/0191224 | A1 | 10/2003 | Maruyama et al. |
| 2003/0203989 | A1 | 10/2003 | Rao et al. |
| 2004/0011668 | A1 | 1/2004 | Shiepe et al. |
| 2004/0034122 | A1 | 2/2004 | Lacy |
| 2004/0059303 | A1 | 3/2004 | Anderson et al. |
| 2004/0067033 | A1 | 4/2004 | Aylward et al. |
| 2004/0068038 | A1 | 4/2004 | Robello et al. |
| 2004/0101466 | A1 | 5/2004 | Dillion et al. |
| 2004/0173531 | A1 | 9/2004 | Hammond |
| 2004/0222561 | A1 | 11/2004 | Hopkins |
| 2004/0233526 | A1 | 11/2004 | Kaminsky et al. |
| 2004/0242752 | A1 | 12/2004 | Fujioka et al. |
| 2004/0259999 | A1 | 12/2004 | Kim et al. |

OTHER PUBLICATIONS

Lueking, Angela et al., Hydrogen Storage in carbon Nanotubes: Residual Metal Content and Pretreatment Temperature, from fuelcelltoday.com, Jul. 9, 2004, http://www.fuelcelltoday.com/FuelCellToday/IndustryInformation/IndustryInformationExternal/NewsDisplayArticle/0,1602,3159,00.html.

Atlas Mining Company Enters into Collaborative Agreement with NaturalNano Inc., from Industrialnewsupdate.com, Mar. 30, 2005, http://www.industrialnewsupdate.com/news/metals-mining/archives/2005/01/atlas_mining_co.pho.

Baral et al., Electroless Metallization of Halloysite, a Hollow Cylindrical 1:1 Aluminosilicate of Submicron Diameter, 1993, Chem. Mater., 5, p. 1227-1232.

An et al.; Characterization of Supercapacitors Using Singlewalled Carbon Nanotube Electrodes; Journal of the Korean Physical Society, vol. 39 (Dec. 2001) pp. S511-S517.

Robinson et al.; A Method for Measuring the Solid Particle Permittivity or Electrical Conductivity of Rocks, Sediments, and Granular Materials; Journal of Geophysical Research, vol. 108, No. B2 (2003), ECV 5-1-9.

Burke, A.; Ultracapacitors: Why, How, and Where is the Technology; Journal of Power Sources 91(2000) 37-50, Elsevier Science.

An et al., "High-Capacitance Supercapacitor Using a Nanocomposite Electrode of Single-WalledCarbon Nanotube and Polypyrrole" *Journal of the Electrochemical Society*, 149(8) A1058-A-1062 (2002).

Conway,B.; Electrochemical Capacitors: Their Nature, Function, and Applications; Electrochemistry Encyclopedia (Mar. 2003).

Namisnyk, A.; A Survey of Electromechanical Supercapacitor Technology; Thesis (Jun. 2003).

White, S. et al.; Fabricated Microvascular Networks; AFRL Technology Horizons, Apr. 2004, pp. 34-35 from http://www.afrlhorizons.com/Briefs/Apr04/OSR0305.html.

Price, R.; Microtubular Encapsulation Technology Developed by the Naval Research Laboratory; exact publication date unknown, but prior to Dec. 2004.

Swanson, D. ; Halloysite Microtubules for Controlled Release; online presentation file of Montana State University, available at http://www.atlasmining.com/Microtubule-Research ppt. Exact publication date unknown but prior to Dec. 2004.

Levis, S.R., et al.; Characterization of halloysite for use as a microtubular drug delivery system; International Journal of Pharmaceuticals 243 (2002) 125-134.

Levis, S.R. et al; Use of coated microtubular halloysite for the sustained release of diltiazem hydrochloride and propranolol hydrochloride; International Journal of Pharmaceuticals 253(2003) 145-157.

Ohmcraft product application literature, "Thick Film on Steel fact sheet," Aug. 13, 2004. obtained from http://www.ohmcraft.com/PDFs/LiteratureDocuments/ThickFilmSteelFactSheet.pdf.

HYDROGEN STORAGE APPARATUS COMPRISED OF HALLOYSITE

CROSS-REFERENCE TO RELATED PATENT APPLICATIONS

This application is a continuation-in-part of co-pending patent application U.S. Ser. No. 11/042,219, filed on Jan. 25, 2005. This patent application also claims the benefit of the filing date of U.S. provisional patent application U.S. Ser. No. 60/559,555 filed Apr. 5, 2004. The entire content of each of the above referenced patents and patent applications is hereby incorporated by reference into this specification.

FIELD OF THE INVENTION

The present invention generally relates to an apparatus for storing molecular hydrogen. More particularly, the present invention relates to a hydrogen storage device comprised of halloysite rods.

BACKGROUND OF THE INVENTION

Molecular hydrogen, $H_2$, has been examined as a possible alternative fuel source. Unfortunately, molecular hydrogen also has numerous drawbacks which have prevented its wide scale use as a fuel. One such disadvantage is the gaseous state of molecular hydrogen. Hydrogen gas is exceptionally difficult to store and transport. The prior art is replete with attempts to design simple, inexpensive hydrogen storage devices to address this need. These attempts include U.S. Pat. No. 4,838,606 to Hunter (Hydrogen Storage System); U.S. Pat. No. 6,074,453 to Anderson (Ultrafine Hydrogen Storage Powders); U.S. Pat. No. 6,143,052 to Kiyokawa (Hydrogen Storage Material); U.S. Pat. No. 6,672,077 to Bradley (Hydrogen Storage in Nanostructure with Physisorption); U.S. Pat. No. 5,906,792 to Schulz (Nanocrystaline Composite for Hydrogen Storage); U.S. Pat. No. 5,653,951 to Rodriguez (Storage of Hydrogen in Layered Nanostructures); and the like. The content of each of the aforementioned patents is hereby incorporated by reference into this specification.

An article by Angela Lueking and Ralph Yang also discusses the need to develop hydrogen storage devices. "An efficient storage media for hydrogen is desirable for the widespread application of fuel cells and the adoption of hydrogen as an energy source. The U.S. Department of Energy (DOE) has set a target of 6.5% by weight for hydrogen storage for new adsorbent materials. Although several metal hydrides are capable of meeting this target, the high desorption temperatures and slow desorption rates limit the widespread application of current metal hydrides. Recent advantages in carbon nanotechnology have been of interest to chemical engineers, as the development, large-scale production, purification, handling and uses of carbon nanofibers will require fundamental chemical engineering principles . . . . Carbon nanofibers, including single-walled carbon nanotubes (SWNTs), multi-wall nanotubes (MWNTs), and graphite nanofibers (GNF), have shown promise for applications in hydrogen storage due to the electronic nature resulting of $sp^2$ hybridization, large surface areas, and molecular sized pores." (Fuel Cell Today [online], [retrieved on Jul. 9, 2004]. Retrieved from the Internet <URL: http://www.fuelcelltoday.com/FuelCellToday/IndustryInformation/IndustryInformation External/NewsDisplayArticle/0,1602,3159,00.html>).

It is an object of this invention to provide a hydrogen storage device comprised of halloysite rods.

SUMMARY OF THE INVENTION

In accordance with the present invention, there is provided an apparatus for storing hydrogen which is comprised of molecular hydrogen, halloysite rods, and a supporting substrate wherein hydrogen is stored within the lumen of the halloysite rods. The technique and apparatus described herein is advantageous because it is inexpensive and substantially simpler compared to other approaches described in the prior art.

BRIEF DESCRIPTION OF THE DRAWINGS

The invention will be described by reference to the following drawings, in which like numerals refer to like elements, and in which:

FIG. 2A is a perspective view of a single halloysite rod while

Figure 1:
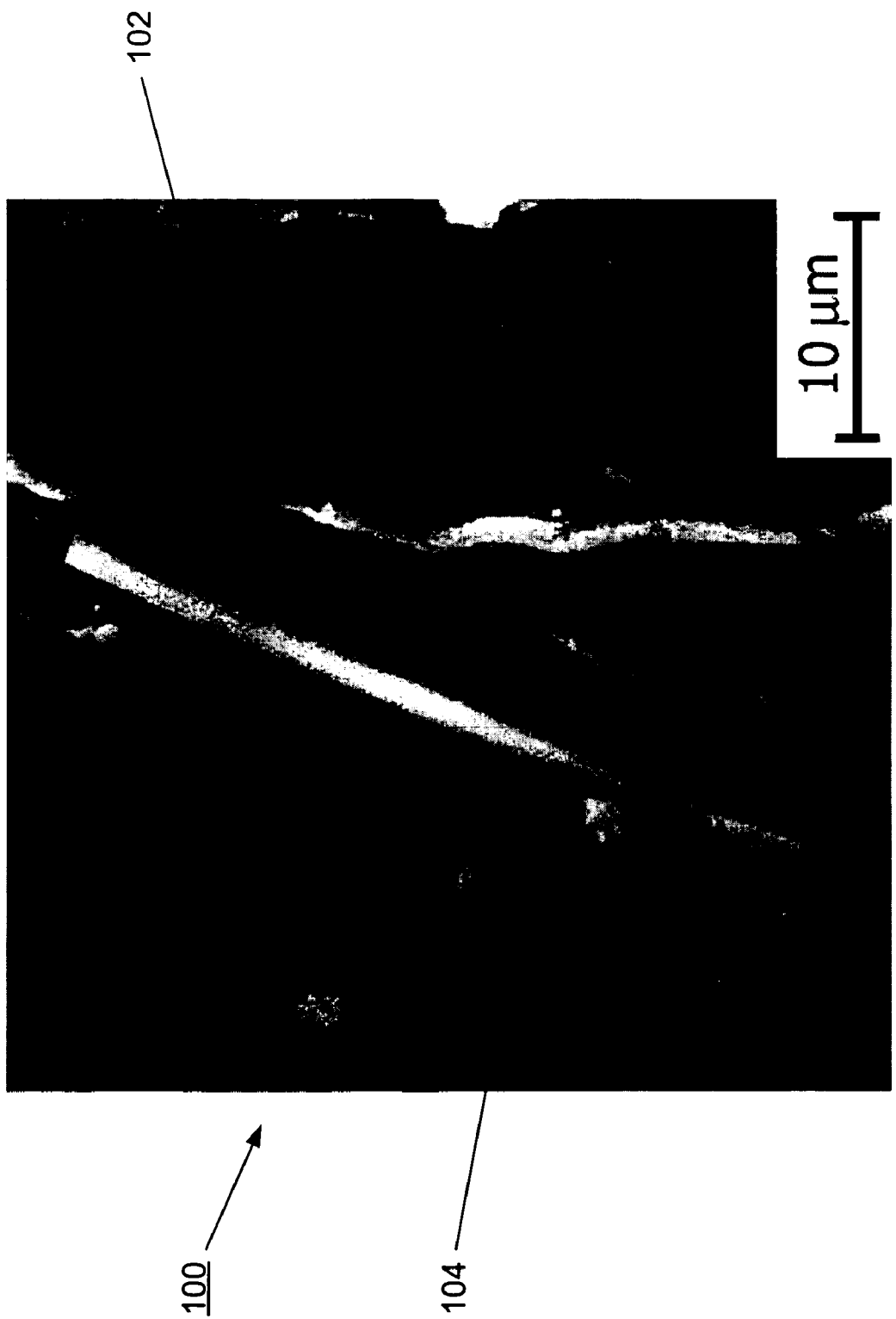
FIG. 1 is a Scanning Electron Microscopy (SEM) image of a sample of halloysite.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements.

Both carbon and non-carbon nanotubes are known, but only carbon nanotubes have been used as hydrogen storage devices. Other, non-carbon nanotubes are known to exist, but have not been utilized as hydrogen storage devices. As disclosed in U.S. Pat. No. 6,401,816 to Price (Efficient Method for Subsurface Treatments, Including Squeeze Treatments) "Several naturally occurring minerals will, under appropriate hydration conditions, form tubules and other microstructures . . . . The most common of these is halloysite, an inorganic aluminosilicate belonging to the kaolnite group of clay minerals . . . . In hydrated form the mineral forms good tubules. In dehydrated form the mineral forms broken, collapsed, split or partially unrolled tubules." The entire content of U.S. Pat. No. 6,401,816 is hereby incorporated by reference into this specification. For additional information related to halloysite as well as other microtubule-like ceramics, reference may be had to U.S. Pat. No. 5,651,976 to Price (Controlled Release of Active Agents using Inorganic Tubules);

U.S. Pat. No. 5,492,696 to Price (Controlled Release Microstructures); U.S. Pat. No. 5,705,191 to Price (Sustained Delivery of Active Compounds from Tubules, with Rational Control); U.S. Pat. No. 6,280,759 to Price (Method of Controlled Release and Controlled Release Microstructures); U.S. Pat. No. 5,246,689 to Beck (Synthetic Porous Crystalline Material Its Synthesis and Use); U.S. Pat. No. 4,098,676 to Robson (Synthetic Halloysites as Hydrocarbon Conversion Catalysts); U.S. Pat. No. 6,231,980 to Cohen (BX CY NZ Nanotubes and Nanoparticles); U.S. Pat. No. 4,960,450 to Schwarz (Selection and Preparation of Activated Carbon for Fuel Gas Storage); and the like. The content of each of the aforementioned U.S. patents is hereby incorporated by reference into this specification.

The non-carbon based nanotubes found in halloysite are quite different from the carbon based nanotubes found in the prior art. As is disclosed in an article posted on the Internet [online], [retrieved on Mar. 30, 2005]. <URL: http://www.industrialnewsupdate.com/news/metals-mining/archives/January2005/atlas_mining_co.pho> "Unlike carbon nanotubes, naturally halloysite nanotubes are inexpensive, readily available in quantity, environmentally benign, and safe and easy to process. Halloysite nanotubes don't clump together, making them ideal for use in electronic fabrication and other high-tech ceramic-composite applications." The applicants have discovered non-carbon nanotubes comprised of halloysite rods that are particularly well adapted to the storage of molecular hydrogen.

FIG. 1 is a Scanning Electron Microscopy (SEM) image of a sample of halloysite 100. As is known to those skilled in the art, halloysite may exist in a variety of morphologies, including spherical agglomerates and tubular rods. The present invention utilizes the tubular halloysite rods as a hydrogen storage device. As illustrated in FIG. 1, halloysite 100 is comprised of halloysite rod 102 and halloysite agglomerate 104.

Figure 2B:
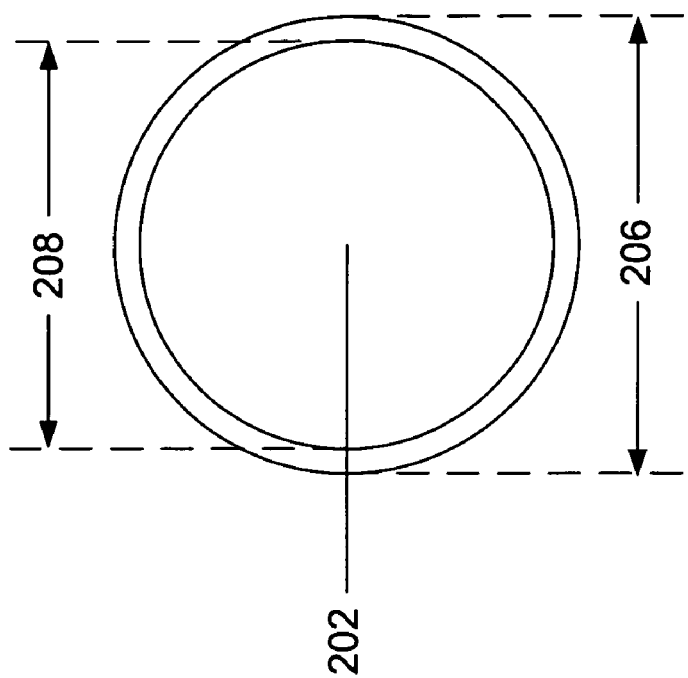
FIG. 2B is an end view of the same rod.
Figure 2A:
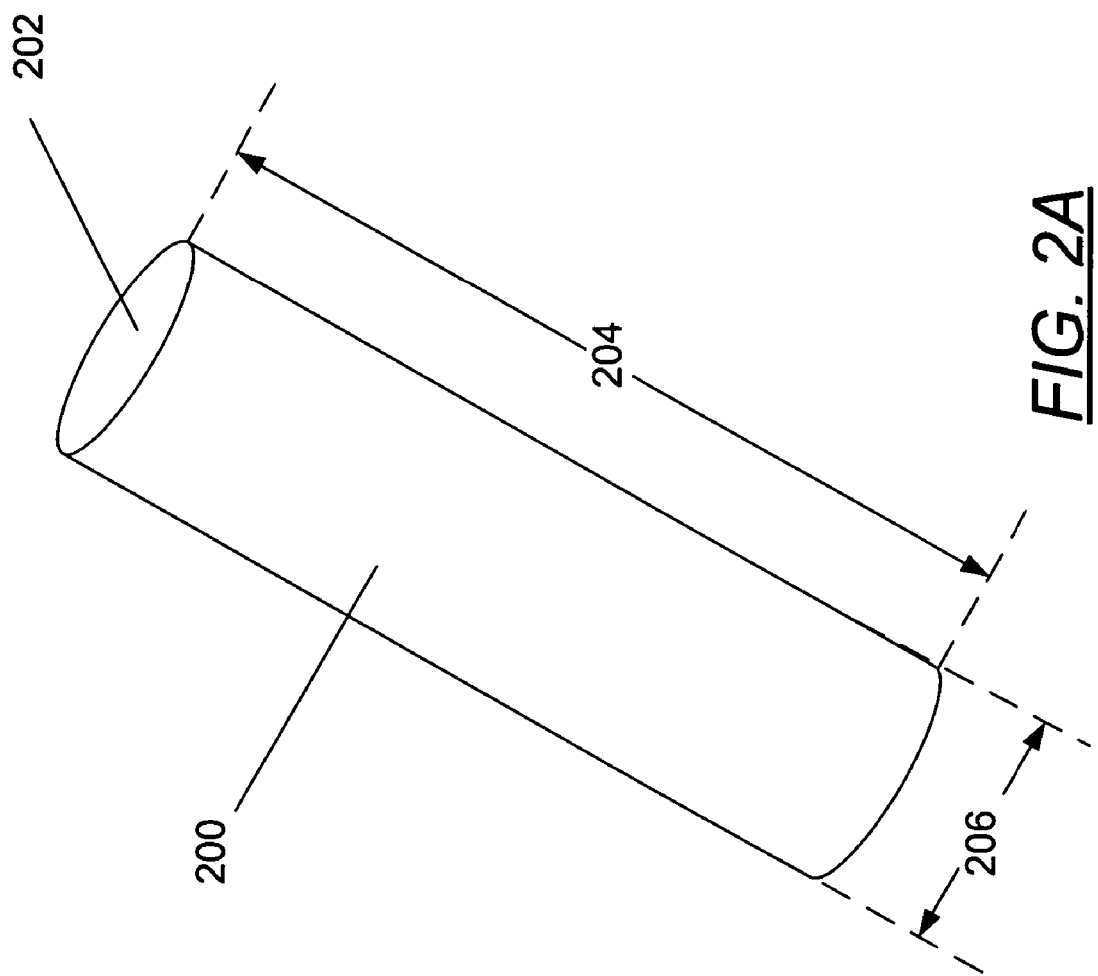

FIG. 2A is a perspective view of a single halloysite rod 200 and FIG. 2B is an end view of halloysite rod 200. Halloysite rod 200 is comprised of lumen 202. Without wishing to be bound to any particular theory, the applicants believe that molecular hydrogen may be disposed in lumen 202. Thus, halloysite rod 200 may function as a hydrogen storage apparatus in a manner similar to the hydrogen storage capability of carbon nanotubes. The length 204 of halloysite rods such as 200 vary from about 100 nm to about 1 μm or more. Transmission Electron Microscopy (TEM) shows that the inside diameter 208 of halloysite rods ranges from about 0.02 to about 0.04 microns and outside diameter 206 varies from about 0.04 to about 0.08 microns. As used in this specification, the term "aspect ratio" refers to the ratio of the length 204 to the outside diameter 206. In one embodiment, halloysite rods are selected which have an aspect ratio of from about 1 to about 10. In another embodiment, halloysite rods are selected which have an aspect ratio of from about 2 to about 8. In yet another embodiment, halloysite rods are selected which have an aspect ratio of from about 3 to about 10.

FIG. 2 also illustrates another property of halloysite rods: their surface to volume ratio. The hollow lumen of the rods provides a high surface to volume ratio. In one embodiment, the halloysite rods have a surface to volume ratio of about 1 to about 10,000. In another embodiment, the halloysite rods have a surface to volume ratio of about 10 to about 1,000. Typically, the outer diameter 206 of halloysite rods is about 50 nm, the inner diameter 208 is about 20 nm, and the length may vary from about 200 to about 500 nm. In other embodiments, the length of the rod may be as long as several micrometers.

Figure 3:
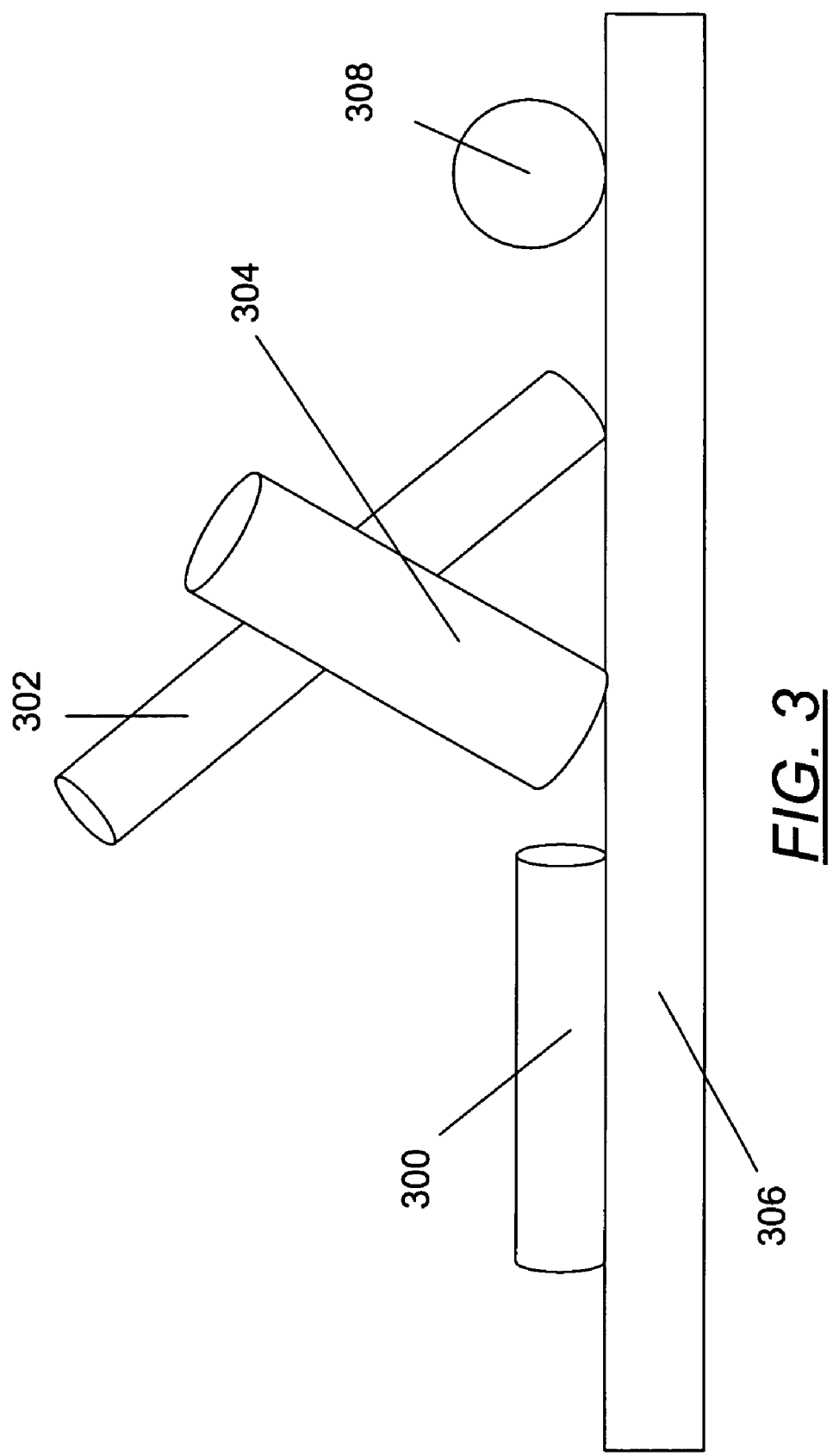
FIG. 3 is a schematic illustration of a multiplicity of halloysite rods disposed on a substrate.

FIG. 3 is a schematic illustration of a multiplicity of halloysite rods 300, 302 and 304 disposed on a substrate 306. In the embodiment depicted, rods 300, 302 and 304 have different aspect ratios. In another embodiment (not shown) at least about 80 weight percent of the halloysite rods have substantially the same aspect ratio. In one such embodiment, the aspect ratio varies such that at least about 80 weight percent of the halloysite rods have an aspect ratio from about 3 to about 10. In another such embodiment, at least about 80 weight percent of the halloysite rods have an aspect ratio from about 5 to about 8.

As shown in FIG. 3, halloysite agglomerate 308 is also disposed on the surface of substrate 306. Without wishing to be bound to any particular theory, applicant believes that only the halloysite rods store appreciable amounts of molecular hydrogen. It is therefore desirable to minimize the amount of halloysite agglomerate 308 present on the surface of substrate 306. In one embodiment, the halloysite sample is comprised of at least about 30 weight percent halloysite rods and the remainder of the halloysite consists essentially of halloysite agglomerates. In anther embodiment, the halloysite sample is comprised of at least about 50 weight percent halloysite rods. In yet another embodiment, the halloysite sample is comprised of at least about 60 weight percent halloysite rods.

Figure 4:
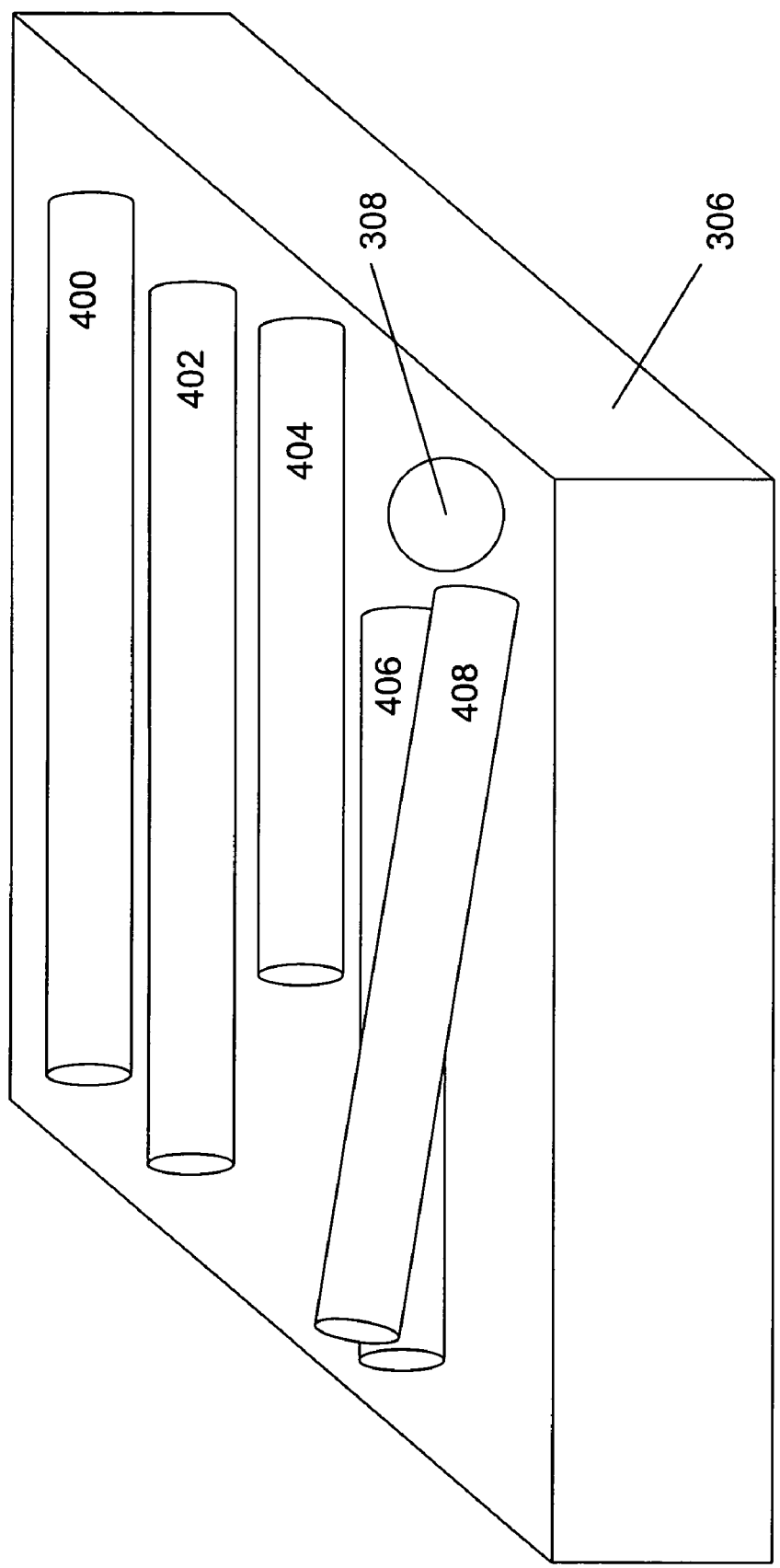
FIG. 4 is a perspective view of a substrate with halloysite rods disposed on the substrate.

FIG. 4 is a perspective view of a substrate with halloysite rods disposed thereon. In the embodiment depicted, substrate 306 is coated with halloysite rods 400, 402, 406 and 408. As illustrated in FIG. 4, halloysite rods 400 to 408 need not be parallel to one another, nor do they need to be parallel to the surface of substrate 306. For example, halloysite rod 408 is not parallel to the surface of substrate 306. Also disposed on the surface of substrate 306 is halloysite agglomerate 308. In one embodiment, substrate 306 is flexible, and can be folded into a tube or cylinder.

Figure 5:
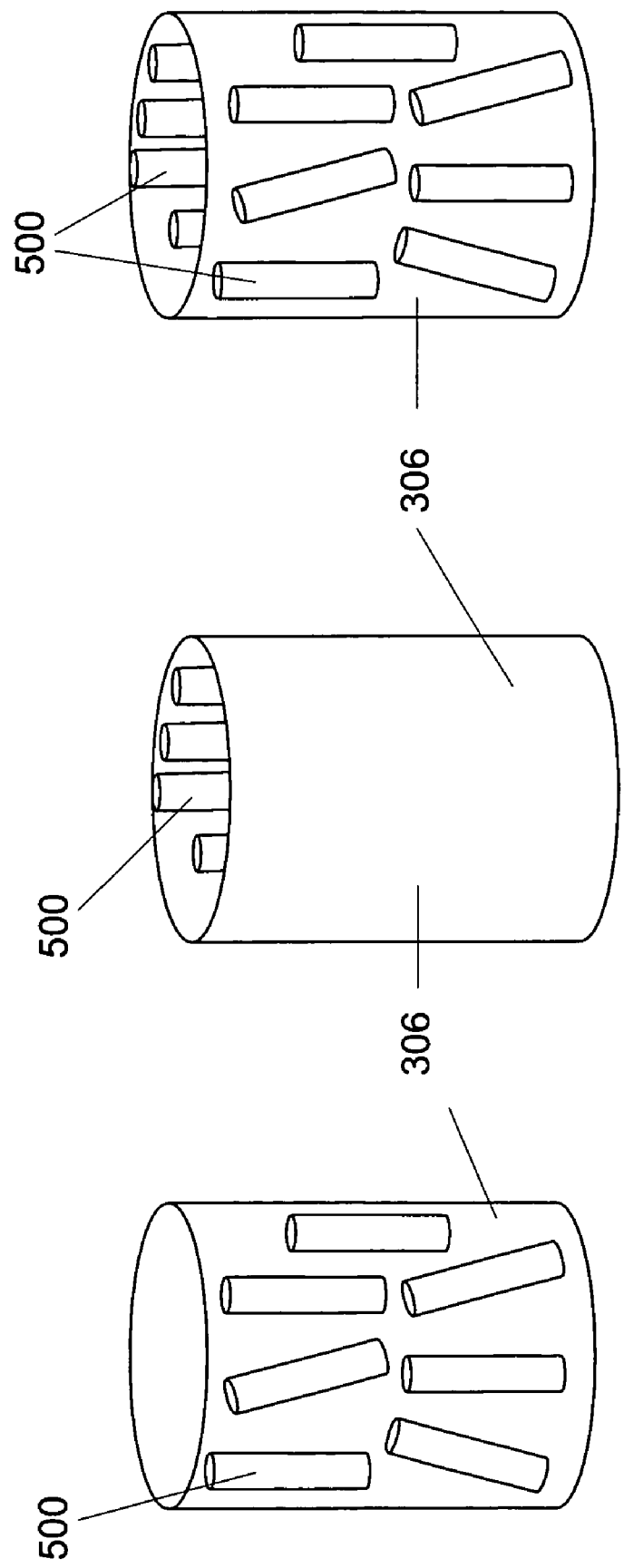
FIGS. 5A, 5B and 5C are perspective views of three tubular substrates with halloysite rods disposed thereon.

FIGS. 5A, 5B and 5C illustrate three embodiments wherein substrate 306 is sufficiently flexible to be folded into a tube or cylinder. In the embodiment depicted in FIG. 5A, the outer surface of flexible substrate 306 has been coated with halloysite rods 500. In the embodiment depicted in FIG. 5B, the inner surface of flexible substrate 306 has been coated with halloysite rods 500. In the embodiment depicted in FIG. 5C, both the inner and outer surface of flexible substrate 306 has been coated with halloysite rods 500.

Figure 6:
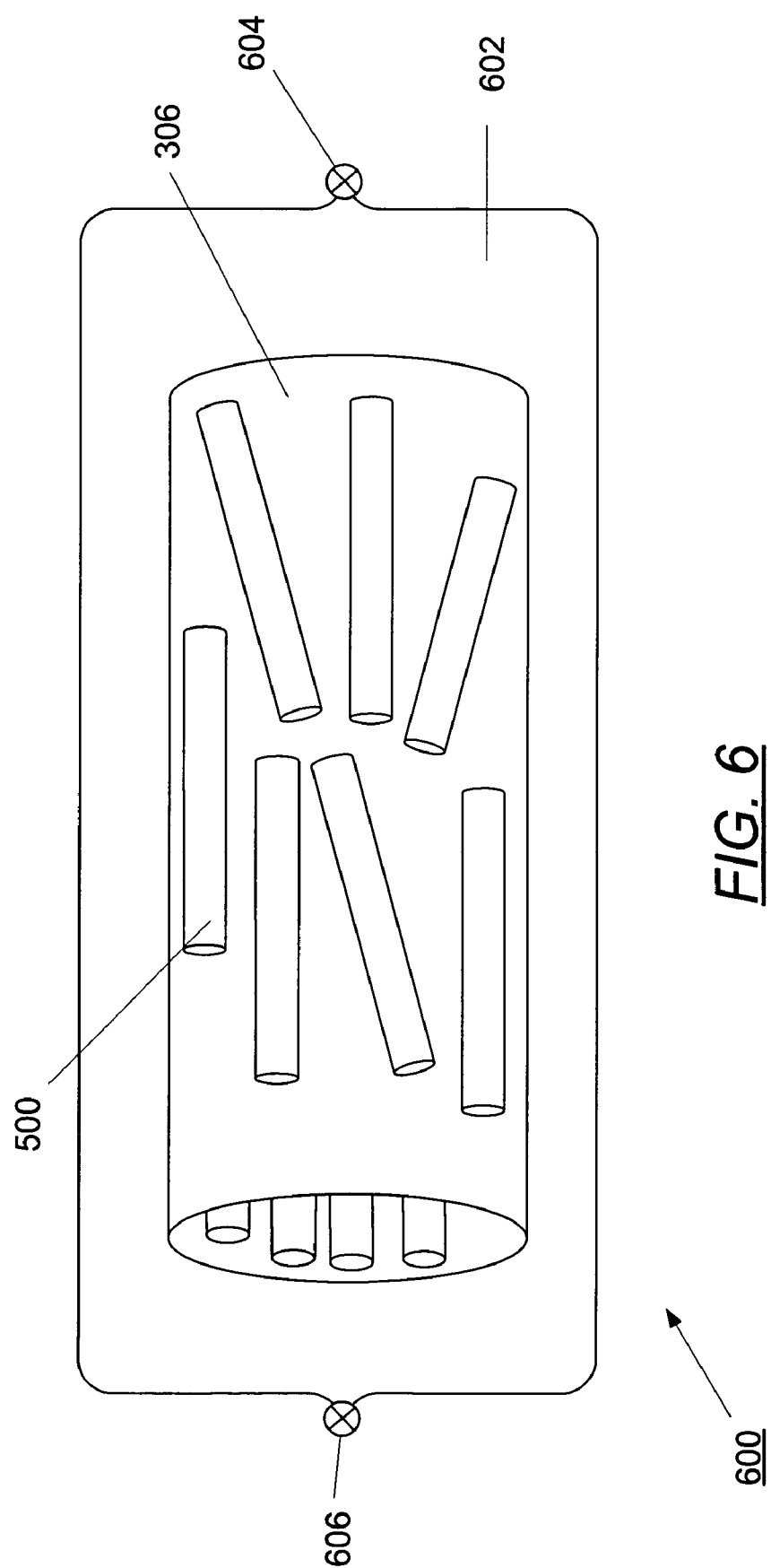
FIG. 6 is a schematic view of a substrate with halloysite rods disposed within a sealed storage container.

FIG. 6 is a schematic view of one hydrogen storage apparatus of the present invention. The hydrogen storage apparatus 600 is comprised of flexible substrate 306 which, in the embodiment depicted, has halloysite rods 500 disposed on the surface thereof. Flexible substrate 306 has been folded into a tubular or cylindrical shape. Substrate 306 and halloysite rods 500 are disposed within sealed storage container 602. Storage container 602 is sealed such that it is substantially air-tight. The air-tight seal of storage container 602 may be broken by operating valves 604 and 606. In the embodiment depicted two such valves are illustrated. In another embodiment, only one such valve is used.

Figure 7:
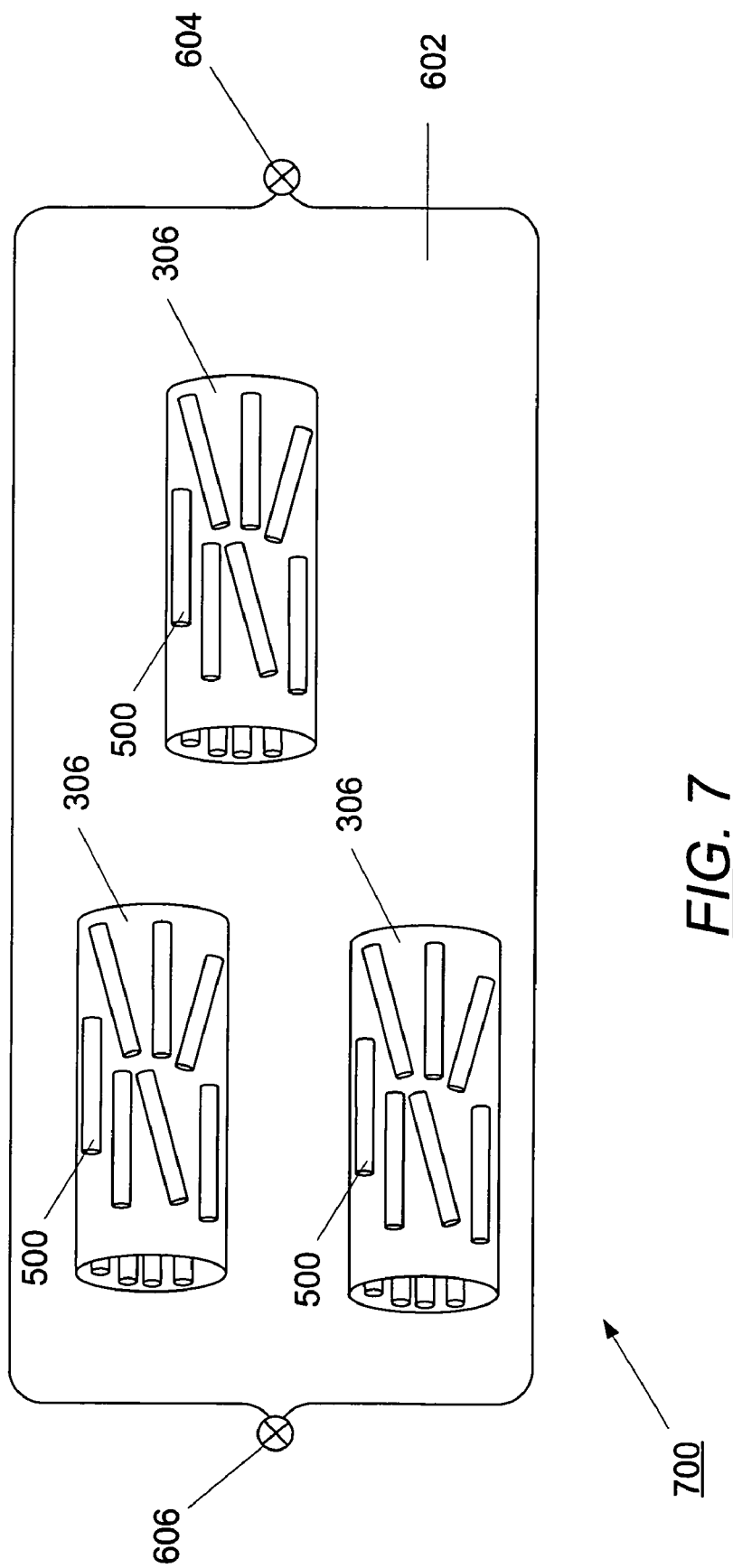
FIG. 7 is a schematic view of a plurality of substrates with halloysite rods disposed within a sealed storage container.

FIG. 7 is a schematic view of another hydrogen storage apparatus of the present invention. The hydrogen storage apparatus 700 is similar to apparatus 600 depicted in FIG. 6 except in that a plurality of substrates 306 are employed.

Figure 8:
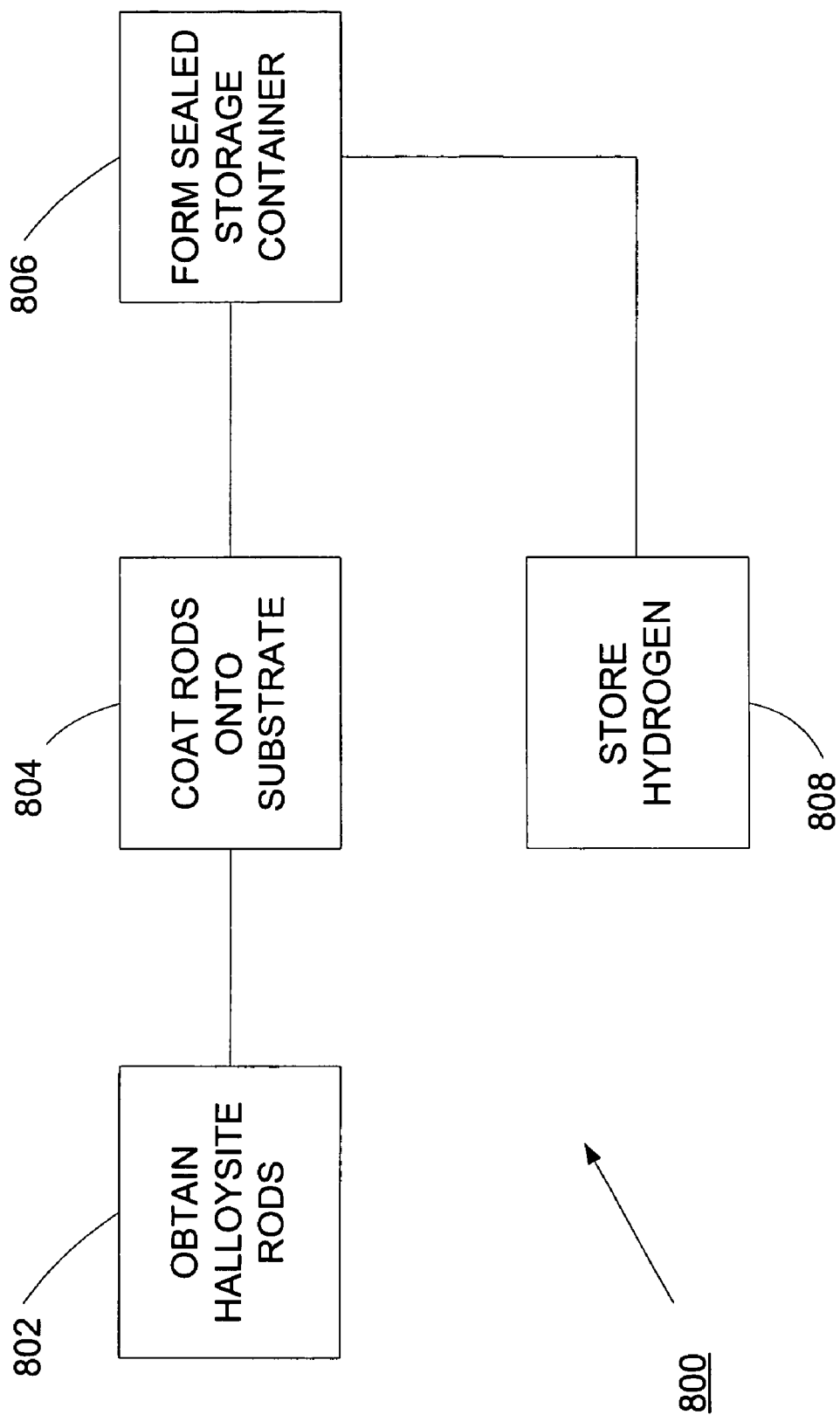
FIG. 8 is a flow diagram of one process of the invention.
Figure 9:
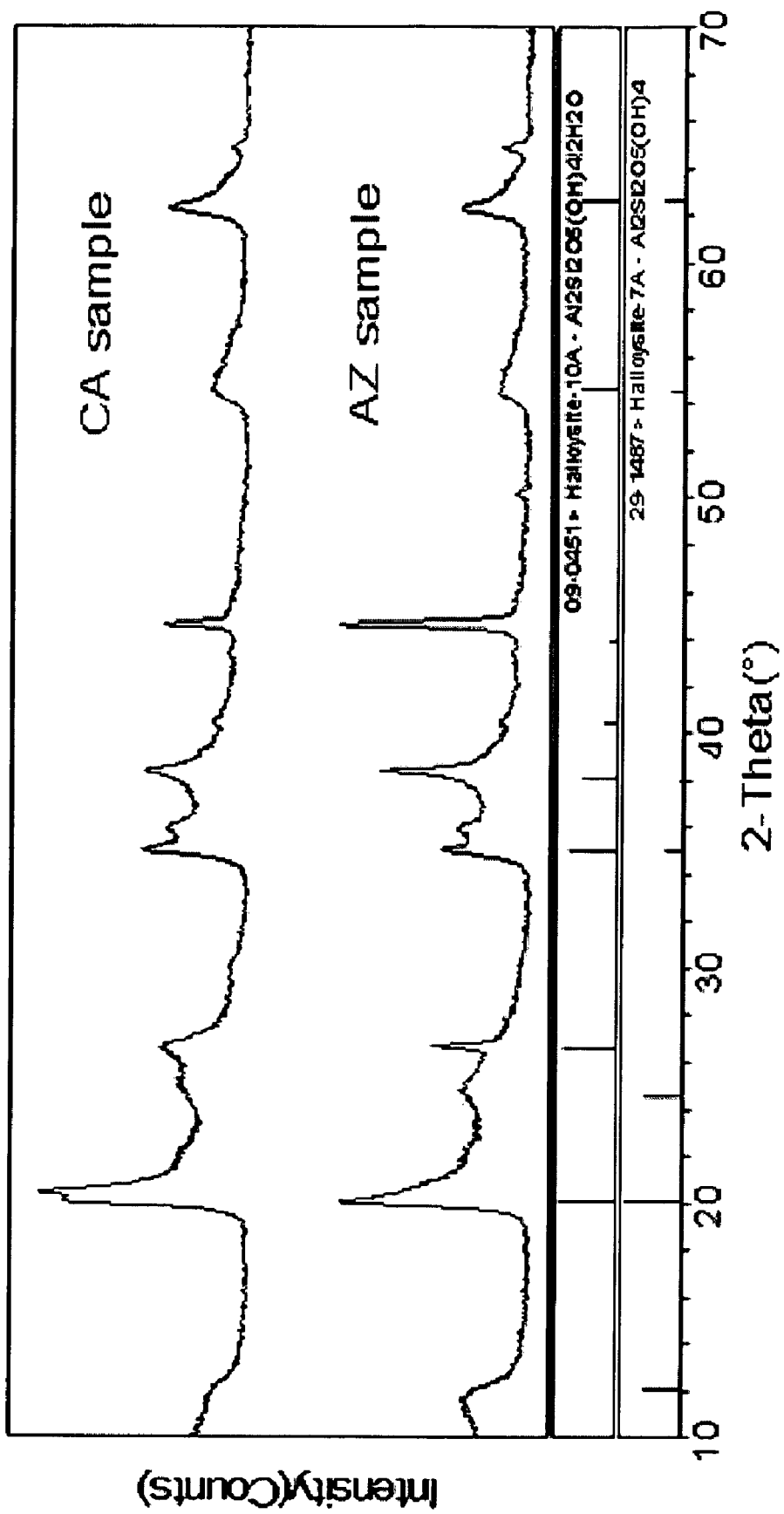
FIG. 9 is an illustration of the X-ray Diffraction patterns of two samples of naturally occurring halloysites.

FIG. 8 is a flow diagram of one process 800 of the invention. In step 802 of process 800, halloysite rods are obtained. Not all samples of halloysite are identical. FIG. 9 illustrates the XRD (X-ray Diffraction) patterns of two samples of naturally occurring halloysite samples: Halloysite AZ Mill (from Halloysite S.E. Wall AZ Mill (AZ sample)) and CA Mill (from Halloysite N.W. PitWall Canada Mill (CA sample)). Generally, the AZ samples contained more halloysite than the CA samples, as illustrated by the sharper and more intense peaks seen in FIG. 9. The AZ halloysite sample contained less than about 10 volume percent rods. The CA halloysite sample contained fewer rods than the AZ sample. In addition to naturally occurring halloysite, procedures exist that allow one to synthesize halloysite in the laboratory. Reference may be had to U.S. Pat. No. 4,098,676 to Robson (Synthetic Halloysites as Hydrocarbon Conversion Catalysts).

Referring again to FIG. 8, and to step 802 thereof, there are several techniques to separate and/or select halloysite rods from halloysite agglomerates. In one embodiment, step 802 is comprised of the step of using electrostatic techniques to select halloysite rods. In another embodiment, centrifugal techniques are used. In another embodiment, a simple filtering technique is used wherein the small agglomerates are removed, thus increasing the percentage of rods. In another embodiment, the halloysite rods are obtained by synthesizing the rods. In yet another embodiment, the density difference between halloysite rods and halloysite agglomerates is exploited, and the halloysite is disposed in an appropriate liquid with the desirable density.

In one embodiment, electrostatic techniques are used to select the halloysite rods. As disclosed in a paper by Yuri M. Lvov, entitled "Nanofabrication of ordered multilayers by alternate adsorption of polyions, nanoparticles and proteins: From planer films to microtemplates." [online], [retrieved on Mar. 27, 2005]. <URL: http://www2.latech.edu/~ylvov/research.html>, "At pH above 4, halloysite is negatively charged." In one embodiment, a positively charged substrate is brought into the proximity of a crude halloysite sample. The negatively charged particles of halloysite are attracted to the positively charged substrate. As the mass of the halloysite particle increases, a larger positive charge is required to move the particle. Therefore, one can select hollow halloysite rods (low density) from relatively solid halloysite agglomerates (higher density) by simply altering the amount of positive charge on the substrate.

In another embodiment, centrifugal techniques are used to select the halloysite rods. As it known to those skilled in the art, centrifugation is a well known technique that separates particles and solutions based on a variety of factors, including particle density, density of the supporting media, particle shape, and particle mass. A wide variety of centrifugation techniques have been developed to separate particulates. In one embodiment, continuous flow centrifugation is used to separate large quantities of halloysite rods from crude halloysite. Reference may be had to U.S. Pat. No. 5,641,622 to Lake (Continuous Centrifugation Process for the Separation of Biological Components from Heterogeneous Cell Populations); U.S. Pat. Nos. 5,053,127 and 4,944,883 to Schoendorfer (Continuous Centrifugation System and Method for Directly Deriving Intermediate Density Material from a Suspension); and the like. In another embodiment, equilibrium centrifugation is used. Reference may be had to U.S. Pat. No. 5,171,206 to Marque (Optimal Centrifugal Separation). In yet another embodiment, elutriation centrifugation is used. Reference may be had to U.S. Pat. No. 5,674,173 to Hlavinka (Apparatus for Separating Particles); U.S. Pat. No. 5,722,923 to Hlavinka (Method for Separating Particles); U.S. Pat. Nos. 5,913,768 and 5,906,570 to Langley (Particle Filter Apparatus); U.S. Pat. No. 5,951,877 to Langley (Particle Filter Method); U.S. Pat. No. 5,939,319 to Hlavinka (Particle Separation Method and Apparatus); U.S. Pat. No. 6,051,146 to Green (Methods for Separation of Particles); U.S. Pat. No. 6,071,422 to Hlavinka (Particle Separation Method and Apparatus); U.S. Pat. No. 6,354,986 to Hlavinka (Reverse-Flow Chamber Purging During Centrifugal Separation); and the like. The content of each of the aforementioned patents is hereby incorporated by reference into this specification.

In another embodiment, rods are selected by first placing the crude halloysite within a media of a selected density. Those halloysite particles with a density substantially similar to the density of the media will be buoyant and are thus easily isolated from the particles wherein the density is not substantially similar. Similar technology is well known to those skilled in the art. Reference may be had to U.S. Pat. No. 4,547,286 to Hsiung (Water Filtration Process and Apparatus Having Upflow Filter with Buoyant Filter Media and Downflow Filter with Nonbuoyant Filter Media), the content of which is hereby incorporated by reference into this specification. As is also known to those skilled in the art, similar buoyancy based separation may be combined with centrifugation techniques. Such techniques are often referred to as equilibrium centrifugation or gradient centrifugation and utilize CsCl as the media.

Any of the aforementioned techniques may be used to select halloysite rods of a specified morphology, for example, a certain aspect ratio. In one embodiment, halloysite rods are selected which have an aspect ratio of from about 1 to about 10. In another embodiment, halloysite rods are selected which have an aspect ratio of from about 2 to about 8. In yet another embodiment, halloysite rods are selected which have an aspect ratio of from about 3 to about 10. Additional information related to the isolation of halloysite rods can be found in applicant's patent application U.S. Ser. No. 11/042,219, filed on Jan. 25, 2005, the content of which is hereby incorporated by reference into this specification.

Referring again to FIG. 8 and step 804 thereof, once halloysite rods have been obtained in step 802, the rods are coated onto a supporting substrate in step 804. As previously discussed, this substrate may be a flexible substrate. In one embodiment, the flexible substrate is stainless steel. In another embodiment, the substrate is a flexible polymeric substrate. In one such embodiment, the flexible polymeric substrate is a polyanionic substrate.

Methods for coating halloysite into polyanionic substrate are known. Reference may be had to the aforementioned paper by Yuri M. Lvov, entitled "Nanofabrication of ordered multilayers by alternate adsorption of polyions, nanoparticles and proteins: From planer films to microtemplates." [online], [retrieved on Mar. 27, 2005]. <URL: http://www2.latech.edu/~ylvov/research.html>. In this paper it is disclosed that "A cleaned substrate of any shape and dimension is immersed into a dilute solution of a cationic polyelectrolyte, for a time optimized for the adsorption of a monolayer (ca 1 nm thick), then is rinsed and dried. The next step is the immersion of the polycation covered substrate into a dilute dispersion of polyanion or negatively charged nanoparticles (or any other nanosized charged species) also for a time optimized for the adsorption of a monolayer, then rinsed and dried. These operations complete the self-assembly of a polyelectrolyte monolayer and monoparticulate layer sandwich unit onto the substrate . . . . Subsequent sandwich units are self-assembled analogously." The same paper also discloses that "At pH above 4 halloysite is negatively charged" and may thus serve as a "nanosized charged species." A variety of polycations (positively charged polymers) may be used to facilitate the binding of anionic halloysite to the substrate. For example, one may use poly(ethyleneimine) (PEI), poly(dimethyldiallylammonium chloride) (PDDA), poly(allylamine) (PAH), polylysine, chitosan, and the like. In this manner, Lvov provided a variety of substrates with halloysite attached. Lvov provided both monolayered halloysite (thickness of approximately 54±5 nm) and multilayered (thickness of approximately 720 nm) halloysite. The resulting polyanion films were "... insoluble in water and in many organic solvents and are stable to at least 200° C."

Referring again to FIG. 8, and step 806 thereof, once the halloysite rods have been coated onto the substrate in step 804, a sealed storage container is formed about the substrate(s) in step 806. In one embodiment the sealed storage container is formed about a single coated substrate (see FIG. 6). In another embodiment, the sealed storage container is formed about a plurality of coated substrates (see FIG. 7). In another embodiment (not shown) the sealed storage container is formed prior to step 804.

Referring again to FIG. 8, in step 808 hydrogen is stored within the lumen of the halloysite rods. This storage may be effected by conventional means such as, e.g., the processes used to store hydrogen in carbon nanotube assemblies. Reference may be had, e.g., to U.S. Pat. No. 6,159,538 to Rodriguez (Method For Introducing Hydrogen Into Layered Nanostructures); U.S. Pat. No. 6,672,077 to Bradley (Hydrogen Storage In Nanostructure With Physisorption); U.S. Pat. No. 6,596,055 to Cooper (Hydrogen Storage Using Carbon-Metal Hybrid Compositions); U.S. Pat. No. 6,591,617 to Wolfe (Method And Apparatus For Hydrogen Storage And Retrieval); U.S. Pat. No. 6,290,753 to Maeland (Hydrogen Storage In Carbon Material); U.S. Pat. No. 6,517,800 to Cheng (Production Of Single-Walled Carbon Nanotubes By a Hydrogen Arc Discharge Method); U.S. Pat. No. 6,294,142 to Nazri (Hydrogen Storage Systems and Method of Making Them); and the like. The content of each of the aforementioned patents is hereby incorporated by reference into this specification.

It is therefore, apparent that there has been provided, in accordance with the present invention, a method and apparatus for the storage of molecular hydrogen. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for storing hydrogen comprising
   a. molecular hydrogen,
   b. halloysite, wherein
      i. said halloysite is comprised of at least about 30 weight percent halloysite rods,
      ii. said halloysite rods are comprised of a lumen, wherein said molecular hydrogen is disposed within said lumen, and
   c. a substrate, wherein
      i. said halloysite is disposed on said substrate.

2. The apparatus for storing hydrogen as recited in claim 1, wherein at least about 80 weight percent of said halloysite rods have an aspect ratio of from about 1 to about 10.

3. The apparatus for storing hydrogen as recited in claim 2, wherein at least about 80 weight percent of said halloysite rods have an aspect ratio of from about 2 to about 8.

4. The apparatus for storing hydrogen as recited in claim 3, wherein at least about 80 weight percent of said halloysite rods have a surface to volume ratio of about 1 to about 10,000.

5. The apparatus for storing hydrogen as recited in claim 4, wherein at least about 80 weight percent of said halloysite rods have a surface to volume ratio of about 10 to about 1,000.

6. The apparatus for storing hydrogen as recited in claim 4, wherein said substrate is a flexible substrate.

7. The apparatus for storing hydrogen as recited in claim 6, wherein said substrate is flexible stainless steel.

8. The apparatus for storing hydrogen as recited in claim 6, wherein said substrate is a flexible polymeric substrate.

9. The apparatus for storing hydrogen as recited in claim 8, wherein said polymeric substrate is a polyanionic polymer.

10. The apparatus for storing hydrogen as recited in claim 9, wherein said polyanionic polymer is selected from the group consisting of poly(ethyleneimine), poly(dimethyldiallylammonium chloride), poly(allylamine), polylysine, chitosan, and combinations thereof.

11. The apparatus for storing hydrogen as recited in claim 10, wherein said halloysite is disposed on said substrate that said halloysite is present in a monolayer.

12. The apparatus for storing hydrogen as recited in claim 4, wherein said substrate is disposed within a sealed storage container.

13. An apparatus for storing hydrogen comprising
    a. molecular hydrogen,
    b. halloysite, wherein
       i. said halloysite is comprised of at least about 50 weight percent halloysite rods,
       ii. said halloysite rods are comprised of a lumen, wherein said molecular hydrogen is disposed within said lumen,
    c. a plurality of flexible substrates, wherein said halloysite is disposed on said flexible substrates, and
    d. a sealed storage container wherein said plurality of substrates is disposed within said sealed storage container.

14. The apparatus for storing hydrogen as recited in claim 13, wherein said halloysite rods have an aspect ratio of from about 1 to about 10.

15. The apparatus for storing hydrogen as recited in claim 14, wherein said halloysite rods have an aspect ratio of from about 2 to about 8.

16. The apparatus for storing hydrogen as recited in claim 13, wherein said halloysite rods have a surface to volume ratio of about 1 to about 10,000.

17. The apparatus for storing hydrogen as recited in claim 13, wherein said halloysite rods have a surface to volume ratio of about 10 to about 1,000.

18. An apparatus for storing hydrogen comprising
    a. molecular hydrogen,
    b. hydrated halloysite, wherein said halloysite consists essentially of halloysite agglomerates and halloysite rods, wherein at least about 60 weight of said halloysite is halloysite rods,
    c. said halloysite rods are comprised of a lumen, wherein said molecular hydrogen is disposed within said lumen.

19. The apparatus for storing hydrogen as recited in claim 18, wherein at least about 1 weight percent of said molecular hydrogen is present in said apparatus.

20. The apparatus for storing hydrogen as recited in claim 19, wherein at least about 5 weight percent of said molecular hydrogen is present in said apparatus.

* * * * *